United States Patent [19]
Giuliani et al.

[11] Patent Number: 4,819,494
[45] Date of Patent: Apr. 11, 1989

[54] CONTINUOUSLY VARIABLE TRANSMISSION

[76] Inventors: Robert L. Giuliani, 1456 Thurston Ave., Honolulu, Hi. 96822; Mark A. Giuliani; Karen A. Giuliani, both of 45-310 Akimala Pl., Kaneohe, Hi. 96744

[21] Appl. No.: 213,126

[22] Filed: Jun. 27, 1988

Related U.S. Application Data

[63] Continuation-in-part of Ser. No. 32,544, Apr. 1, 1987, abandoned, which is a continuation-in-part of Ser. No. 854,108, Apr. 21, 1986, abandoned, which is a continuation-in-part of Ser. No. 749,486, Jun. 27, 1985, abandoned, which is a continuation-in-part of Ser. No. 416,453, Feb. 4, 1983, abandoned.

[51] Int. Cl.$^4$ .............................................. F16H 15/08
[52] U.S. Cl. ......................................... 74/190; 74/194
[58] Field of Search .......................... 74/194, 190, 201

[56] References Cited

U.S. PATENT DOCUMENTS

| | | | |
|---|---|---|---|
| 544,688 | 8/1895 | Pulbrogh | 74/215 |
| 659,427 | 10/1900 | Worth | 74/215 |
| 888,761 | 5/1908 | Snyder et al. | 74/190.5 |
| 1,083,328 | 1/1914 | Kitchen et al. | 74/201 |
| 1,092,076 | 3/1914 | Morris | 74/194 |
| 1,166,838 | 1/1916 | Klay | 74/201 |
| 1,168,057 | 1/1916 | Buck | 74/194 |
| 1,207,216 | 12/1916 | Roberts | 74/193 |
| 1,220,554 | 3/1917 | Rieher | 74/201 |
| 1,410,747 | 3/1922 | Gill | 74/190.5 |
| 1,459,979 | 6/1923 | Kohn | 74/193 |
| 1,468,401 | 9/1923 | Roberts | 74/193 |
| 1,489,521 | 4/1924 | Conrad | 74/193 |
| 1,738,965 | 12/1929 | Reina | 74/208 |
| 2,218,651 | 10/1940 | Lenney | 74/208 |
| 2,353,448 | 7/1944 | Edlich | 74/193 |
| 3,323,384 | 6/1967 | Wodarlsa | 74/196 |
| 3,793,910 | 2/1974 | Nasvytis | 74/690 |
| 3,802,295 | 4/1974 | Lemmens | 74/796 |
| 4,137,785 | 2/1979 | Virlon | 74/194 |
| 4,183,253 | 1/1980 | Borello | 74/193 |
| 4,229,985 | 10/1980 | Borello | 74/193 |
| 4,304,154 | 12/1981 | Townend | 74/796 |
| 4,459,868 | 7/1984 | Sargent | 74/191 |
| 4,499,781 | 2/1985 | Luv | 74/193 |

FOREIGN PATENT DOCUMENTS

| | | | |
|---|---|---|---|
| 1018689 | 10/1957 | Fed. Rep. of Germany | 74/796 |
| 401723 | 1/1943 | Italy | 74/193 |

OTHER PUBLICATIONS

Hydronautics, Inc., Technical Report No. 8158.02 CVT's, Product Class Evaluations, Poqeutte, Jun. 1981.
NASA Design Study of CVT's, Sep. 1980.
Popular Science, "CVT the No-Shift Transmission", David Scott, Jun. 1980.
Popular Science, "Cyclodial Transmission", David Scott, Oct. 1982.
Guide to Engineered Materials "Polymers: Application" Vol. 2 No. 1, Jun. 1987, pg. 89.

Primary Examiner—Leslie A. Braun
Assistant Examiner—Scott Anchell
Attorney, Agent, or Firm—R. L. Giuliani

[57] ABSTRACT

The continuously variable transmission has a rotating drive unit and driven unit sharing a common axis Splined drive shafts extend radially from the common axis and are rotatably driven by the drive unit. Drive rollers are splined to the drive shafts so that the drive rollers are shiftable along the length of the drive shafts. The drive rollers transmit power directly to the driven unit in forward drive. The shift of the rollers while in forward drive continuously varies the distance between the rollers and the common axis so that the shift continuously varies the torque drive to the driven unit. All the drive rollers in a plurality are always equidistant from the common axis. Elastohydrodynamic oil may be used between the rollers and the driven unit to prevent metal to metal contact.

Neutralizing the drive can be done by shifting the drive rollers a certain distance from the common axis at which distance the rollers are disengaged from the driven unit. For reversing the drive, continued radial shift brings the rollers into contact with second rollers. The second rollers transmit the power from the drive rollers to the driven unit which causes the driven unit to reverse its direction of rotation.

15 Claims, 3 Drawing Sheets

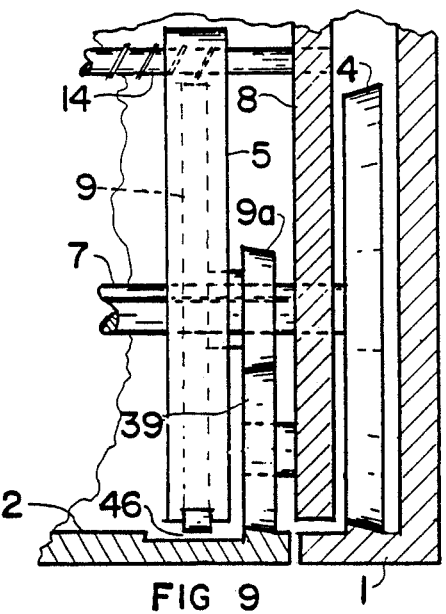

CONTINUOUSLY VARIABLE TRANSMISSION

CROSS REFERENCES TO RELATED APPLICATIONS

This application is a continuation-in-part of Ser. No. 032,544 filed Apr. 1, 1987, now abandoned, which is a continuation-in-part of Ser. No. 854,108 filed Apr. 21, 1986, now abandoned, which is a continution-in-part of Ser. No. 749,486 filed June 27, 1985, now abandoned, which is a continuation-in-part of Ser. No. 416,453 filed Feb. 4, 1983, now abandoned.

BACKGROUND OF THE INVENTION

1. Field of the Invention

This invention is in the field of continuously variable traction transmissions.

2. Description of the Prior Art

There are several types and variations of continuously variable traction transmissions in the prior art[3]. To the inventor's knowledge, they are not notable in vehicle applications with the possible exception of the belt drive CVT. It has vee belts cooperating with two power shifts which have variably changeable sheaves where the pitch variation of the sheaves varies the belt's distance from the shafts' axes to vary the speed. Of all the types, these belt driven CVT's probably have received most recognition. However, after years of development, they are still not widely used on vehicles[1].

In spite of improvements in the technology[3], there is still a need for a better traction drive CVT. References cited U.S. Pat. No. 1,771,806, 7/1930, Mitchell, 74/191 x;
U.S. Pat. No. 1,771,807, 7/1930, Mitchell, 74/191 x;
U.S. Pat. No. 1,981,910, 11/1934, Ehrlich, 74/200;
U.S. Pat. No. 2,178,399, 10/1939, Madle, 74/796;
U.S. Pat. No. 2,203,636, 6/1940, Schmitter, 74/291;
U.S. Pat. No. 2,203,637, 6/1940, Schmitter, et. al., 74/281;
U.S. Pat. No. 2,319,319, 5/1943, Bade, 74/796;
U.S. Pat. No. 2,405,957, 8/1946, Jones, 74/281;
U.S. Pat. No. 2,956,441, 10/1960, Perry, 74/200;
U.S. Pat. No. 2,959,063, 11/1960, Perry, 74/208;
U.S. Pat. No. 3,048,046, 8/1962, Cosby, 74/91;
U.S. Pat. No. 3,048,047, 8/1962, Richardson, 74/200;
U.S. Pat. No. 3,207,004, 9/1965, Chery, 74/796;
U.S. Pat. No. 3,224,285, 12/1965, Maichen, 74/192;
U.S. Pat. No. 3,224,287, 12/1965, Gesche, et.al., 74/230.17;
U.S. Pat. No. 3,224,300, 12/1965, Stuemky, 74/208 x;
U.S. Pat. No. 3,677,109, 7/1972, Nazvytis, 74/796;
U.S. Pat. No. Re. 30,981, 6/1972, Kemper, 74/193.

1. Popular Science, May 1985, pg 65.
2. TRACTION DRIVES, Frederick W. Heilich, et.al., Marcel Dikker, Inc. 1983.
3. Machine Design, Oct. 24, 1985, pgs 68–75.
4. Guide to Selecting Engineered Materials (spherical rollers), pg 89, Vol 2, No 1, Mid June 1987, by ASM International, Metals Park, Ohio 44073.

SUMMARY OF THE INVENTION

This invention is a continuously variable traction transmission that preferably employs several connecting drive shafts to transmit variable torque drive between coaxial drive and driven units.

The connecting shafts are radially disposed about the common axis of the drive and driven units. Each connecting shaft has a pair of rollers or wheels. One roller, which could be a gear, engages the drive unit and the other, preferably a traction wheel, communicates with the driven unit so that rotary motion is transmitted from the drive to the driven unit through the communications. Every communication point is simultaneously shiftable along its radial over a continuous, measurable distance so that every communication point is always equidistant from the common axis. As they are shifted, the radial distances between these points and the common axis continually changes to effect the continuously variable torque drive between the drive and driven units.

Each of the several connecting shafts carries an equal part of the total drive. This feature permits the invention to transmit large drive reliably. It also avoids possible galling of the parts that are in frictional contact in one of the embodiments.

A novel reverse and neutral is incorporated into the invention. Alternatively, a conventional clutch and gearbox can be coupled to the power train to effect the reverse and neutral.

This invention can vary high input rpm or high torque in transmitting high power.

It is an object of this invention to transmit high continuously variable torque drive reliably.

Another object is to reverse and neutralize drive.

Another object is loose tolerances and common parts for low cost manufacture.

Other objects of the invention will become apparent from the detailed description and drawings.

BRIEF DESCRIPTION OF THE DRAWINGS

FIG. 9 shows reverse for an embodiment that increases output speed.

DETAILED DESCRIPTION OF THE INVENTION

Figure 1:
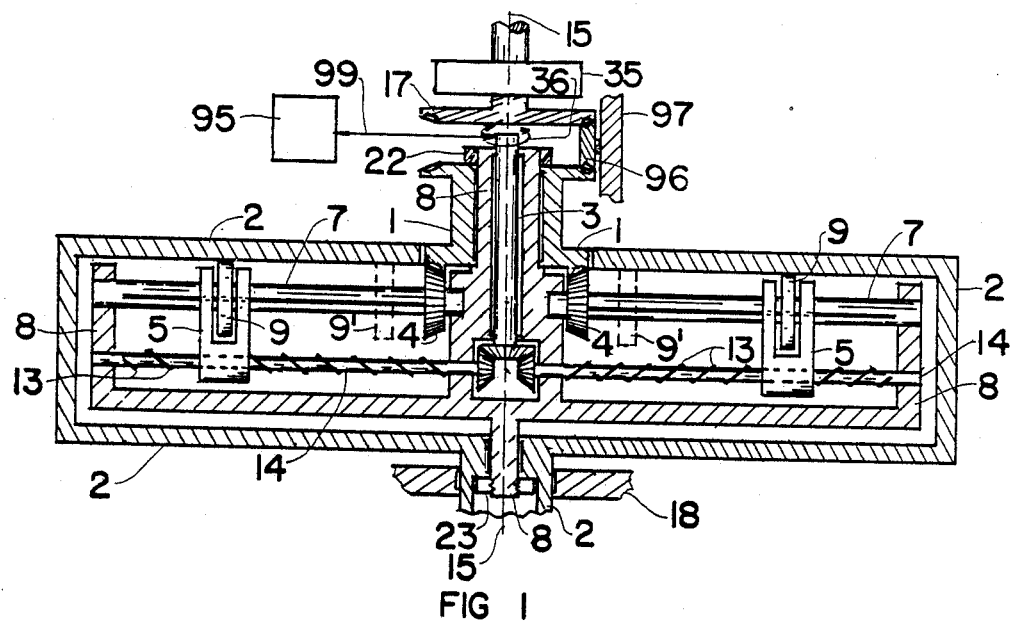
FIG. 1 is a vertical cross section of the invention.

Certain words and phrases will be used herein such as, "lower end", "upper", etc. only for relating to the accompanying drawings. It will be evident that standard bearings, bushings, etc. may be used so symbols, or omissions are used in the drawings.

FIG. 1 shows the invention in cross section. Support 8 is immovable and symmetrical about axis 15. Support 8 is further suitably secured to a structure 18 at its both ends. Support 8 is partially bored, as shown in FIG. 1, for rotatably carrying shaft 3. Using suitable bearings, shaft 3 shiftably rotates 36 about its axis 15 while being restricted from movement along axis 15. Shaft 3 is actuated by a suitable actuator 95 through a communication means 99. The actuator 95 could be a person or computer communicating 99 through linkages or a servomotor, for instance.

Figure 4:
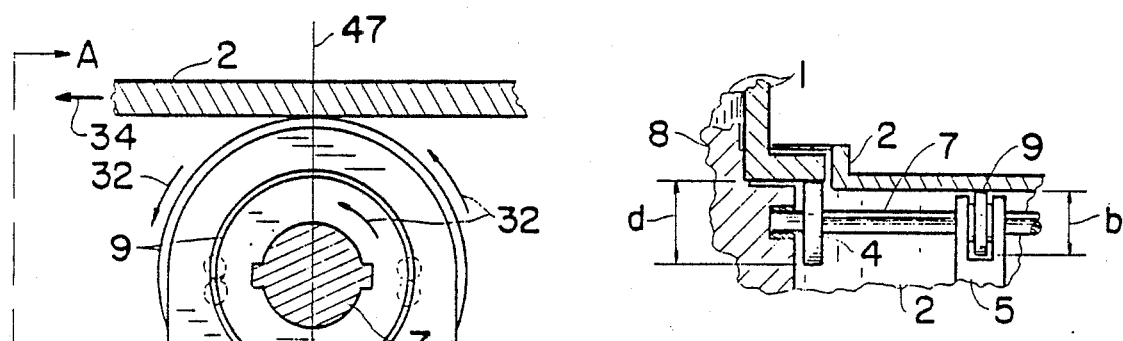
FIG. 4 shows a variation of FIG. 1, in cross section with parts broken away, for simplfying the torque ratio.
Figure 4:
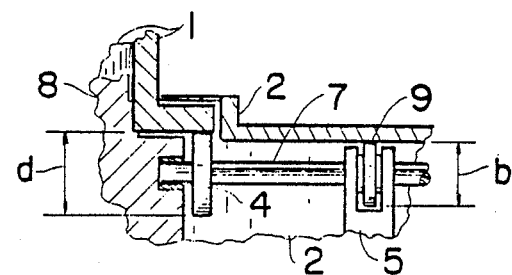

Rotatably fitted around part of support 8 is the invention's drive unit 1. Unit 1 also rotates on axis 15 with the use or suitable bearings between it and support 8. Unit 1 is flanged at its lower end, as shown in FIG. 1, and the flange carries a drive gear on its underside for engaging gear 4. The drive gear could be omitted and the gear 4 replaced by a wheel 4 as shown in FIG. 4.

Unit 1 is held immovable along axis 15 by a washer and nut 22 which is threaded on the upper end of support 8 and a bearing which holds the lower end of unit 1.

A drive means, such as gear 17, transmits power to drive unit 1 from an engine, for example, the inventors' engines in U.S. Pat. No. 4,632,081 issued Dec. 30, 1986 or the MODULAR ENGINE, Ser. No. 768,683. Gear 17 meshes with idler 96 carried by the casing 97. The idler 96 meshes with a gear on drive unit 1 as shown in FIG. 1. Casing 97 can enclose the gears 17, 96 and 1 and also serve as a support structure 18 for one end of the invention. When using this invention for front wheel drive in a vehicle, the inventors' engines are particularly suitable for the positioning of the drive gear 17 as shown in FIG. 1. It is obvious that both drive axles would then be equal in length.

A gear box 35 could neutralize and reverse and drive. However, an alternative for effecting neutral and reverse without gear box 35 will be explained later with the aid of FIGS. 5, 6 or 9.

Driven unit 2 is also carried by support 8 as shown in FIG. 1. The support 8 is spindle shaped at its lower end where it is coupled to unit 2. Nut 23 is threaded on the spindled end and, in combination with a keyed washer, cotter pin, and tapered roller bearings, it holds unit 2 in place along axis 15 while permitting unit 2 to rotate. This coupling may be the same used to couple the front wheel of an automobile to the axle spindle. There should be no need for costly machining of new parts.

Figure 7:
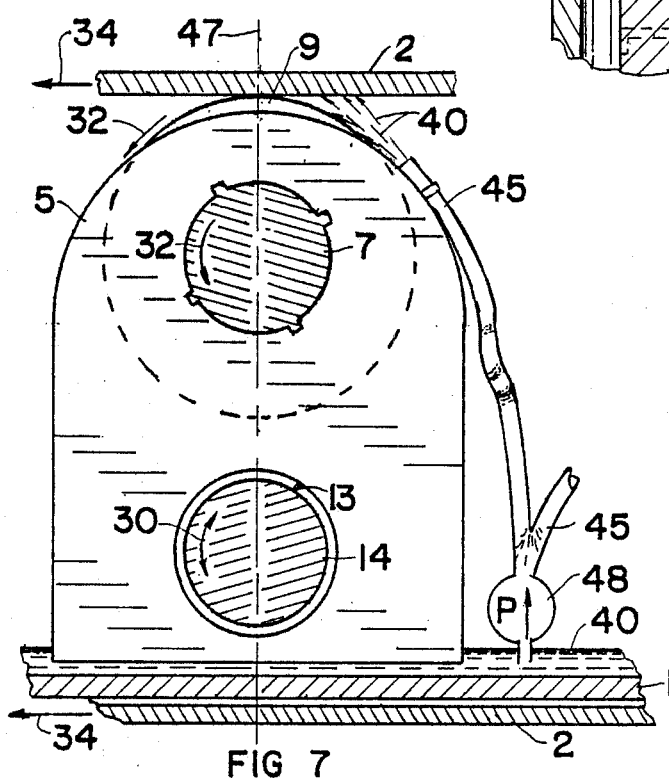
FIG. 7 is essentially the same as FIG. 2 but includes traction fluid between the drive rollers and the driven unit.

Driven unit 2 has partly the general shape of a hollow drum which essentially houses an assembly of the invention's working parts. The drum part of unit 2 could be in two parts, secured by bolts 44 or other means, for easy access to the assembly inside. The top of unit 2 is essentially flat such as the top of a drum. On the top of unit 2, centered on axis 15, is an aperture for drive unit 1. The aperture may be provided with a dust cover to keep the interior of unit 2 clean. If the invention is constructed to use elasto-hydrodynamic(e-h) oil 40, e.g. traction fluid[2], as shown in FIG. 7 and explained later, then a suitable seal between unit 1 and unit 2 should be used at the aperture. A suitable casing (not shown) could enclose the flanged part of unit 1 and the drum shaped part of unit 2 to seal the entire assembly while serving to anchor the invention to the frame 18, 21.

The bottom part of unit 2 extends into an output power shaft centered on axis 15 where this power shaft has a bore to accommodate the combination spindle, washer, nut 23, etc. The power output shaft is shown broken away in FIG. 1 but, obviously it can lead into a universal joint or other mechanism in a power train. If the mentioned casing is not used, the output power shaft may be journaled in a frame 18 for supporting one end of the invention.

Between its spindle at its lower end and its bored shaft at its upper end, support 8 is substantially housed within the drum shaped part of driven unit 2. This part of support 8 sustains several rotatable shafts 7. The rotational axis of each of the shafts 7 is preferably a radial leading from axis 15. As such, each shaft 7 has its rotational axis in a plane of axis 15 on one side thereof. Each shaft 7 is rotationally supported at its radially extended end by support 8 with suitable bearings. To do this, support 8 is shaped to extend radially from axis 15 and then upward, essentially as shown in FIG. 1, somewhat like a pan.

In FIG. 1, shaft 7 is rotatably carried by support 8 at its radially interior end where shaft 7 carries gear 4. Unit 1 drives gear 4 to rotate shaft 7. A suitable bevel mesh could be used between the drive gear on the flange of unit 1 and the gear 4. Alternatively, if the invention uses e-h oil film (FIG. 7), then the gear mesh can be replaced by a roller 4 as shown in FIG. 4.

There is a rotatable shaft 14 to match each shaft 7. Support 8 is shaped to carry shaft 14 essentially in the same manner as it carries shaft 7. Preferably, shaft 14 is parallel to shaft 7 causing it to lie in the same axial plane 47 on the same side of axis 15 as its matching shaft 7.

The rotatational shaft 36 of shaft 3 is controlled by any of several actuator means 95 including a person, a computer, or pressure differentials in the intake manifold of an engine. The communication 99 could be simple linkages between the actuator 95 and the shaft 3.

On its radially interior end, each shaft 14 engages shaft 3 through a gear mesh as shown in FIG. 1. While the input power is continuously transmitted to unit 2, the controlled rotational shaft 36 of shaft 3 causes an equal rotational shift 30 in each and every shaft 14 so that the shiftable rotation 36 of shaft 3, in either direction, simultaneously imparts synchronized, precise rotation to each and every shaft 14.

An arm 5 serves as an operative coupling between shaft 14 and shaft 7. Arm 5 is coupled to each shaft 7 through wheel 9 as shown in several of the drawings. The arm 5 rotatably supports wheel 9 with suitable bearings. Shaft 7 is splined substantially along its entire length so that wheel 9 can be rotated 32 (FIG. 2, FIG. 7) by shaft 7 while allowing the wheel 9 to shift 31 (FIG. 3, FIG. 5) along the axis of shaft 7. Wheel 9 engages the interior of the top of unit 2 to cause unit 2 to rotate 34 in the forward direction. It must be clear that each of a plurality of shafts 7 will rotate a wheel 9 in the same direction as the others in the plurality to reinforce each other in rotating unit 2, i.e., each wheel 9 transmits an equal part of the total drive between the drive and driven units. In this combination, the power is transmitted from input gear 17, through gear 4 (or wheel 4), and then to driven unit 2 through wheel 9.

Figure 2:
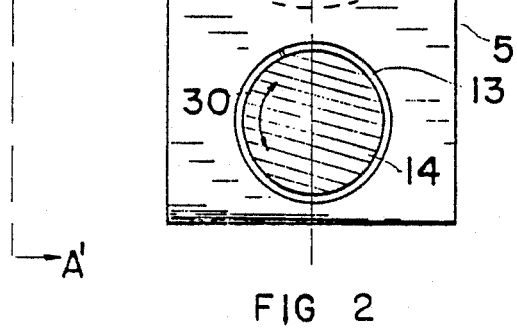
FIG. 2 shows interaction of certain of the power transmitting parts of FIG. 1.
Figure 3:
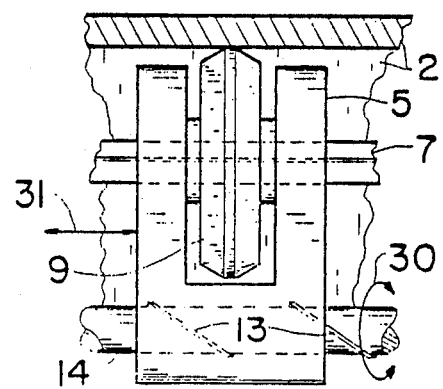
FIG. 3 is a view of FIG. 2 along line A—A'.

Shaft 7 and shaft 14 engage arm 5 so that arm 5 (and wheel 9) remains shiftable 31 in the plane 47 described by the axes of shaft 7 and shaft 14 regardless of the forces imposed on arm 5. FIGS. 1-3 are intended to clearly show this feature where the arrow 31 signifies the axial shift. The variable m, in FIG. 8, also indicates this shift. It will be explained later.

In FIG. 1, each shaft 14 has threads 13 such as a jackscrew. The threads 13 engage arm 5 so that when shaft 14 is rotated by shaft 3, arm 5 and its wheel 9 are shifted 31 along shaft 7 and shaft 14. This shift 31 is radial to axis 15 and continuous from one position of wheel 9 to another position 9' along the substantial length of shaft 7 and shaft 14 during each rotatable shift 36 of shaft 3. The threads 13 are oriented, as shown, on each and every shaft 14 so that they simultaneously and synchronously move each arm 5 the same distance in the same direction, either toward or away from axis 15.

In this way, every arm 5 and wheel 9 will always be an equal distance from axis 15. As each arm 5 changes the radial distance between its wheel 9 and axis 15, each wheel 9 will trace a spiral path on the surface of unit 2 and this causes torque to be continuously varied at the output shaft or unit 2. When shaft 3 is not shifted 36, each wheel 9 in a plurality will trace the same circular track on the surface of unit 2 to remain a constant distance from axis 15 which keeps the torque at the output shaft of unit 2 constant.

Figure 5:
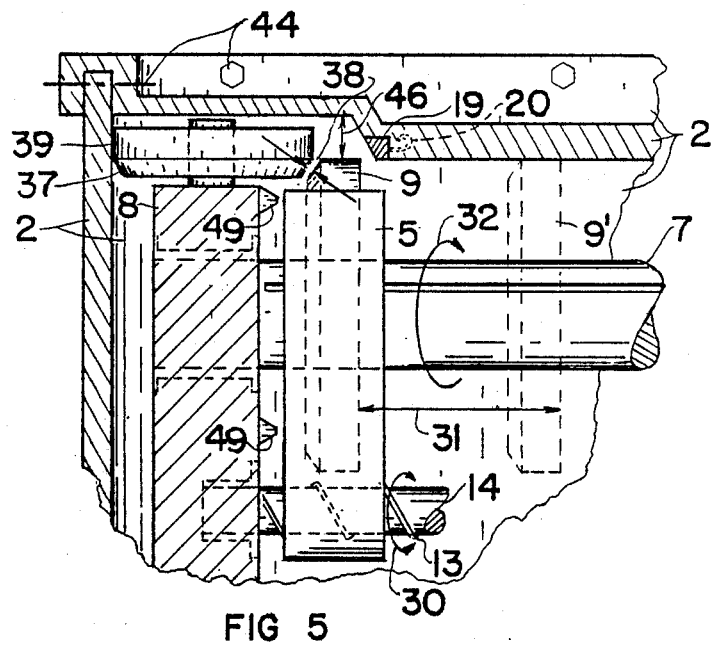
FIG. 5 with parts broken away, shows a method for neutralizing the power between the drive and driven units.
Figure 6:
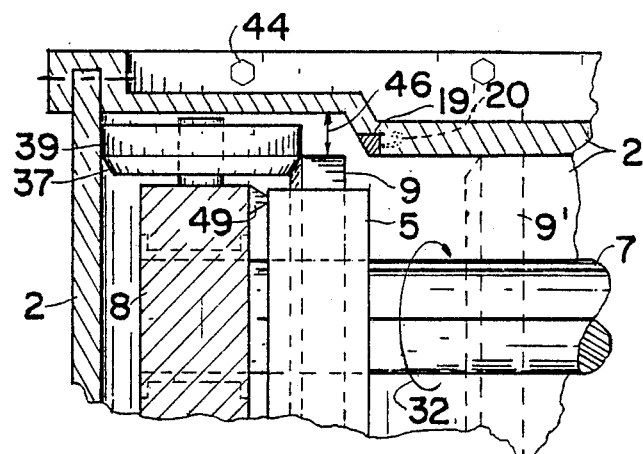
FIG. 6 shows reversing the drive in an embodiment that reduces output speed.

Gearbox 35 is eliminated for the embodiment shown in FIG. 5 and FIG. 6. It is particularly suitable for a high speed drive unit 1. FIG. 5 shows how power between drive unit 1 and driven unit 2 can be neutralized by isolating wheel 9 from unit 2 with gap 46 and gap 38. The isolation is caused by continuing the shift 31 of wheel 9 radially outward from axis 15 until wheel 9 encounters gap 46. The gap 46 is formed with an annular depression in the upper interior surface of unit 2 near its outer rim and centered at axis 15. Wheel 9 will continue to rotate after disengagement from unit 2. In some heavy load applications, it may be preferable to include clutch member 19. In this case, the depression is shaped along its inner periphery to carry the ring shaped clutch member 19 in a position that limits the movement of member 19 to rotation about axis 15. Springs 20 couple member 19 to unit 2 in a way that further limits the rotatational movement to a reasonably short rotational shift which absorbs the initial shock load from the contact with rotating wheel 9 as wheel 9 is shifted from the gap 46 toward position 9' shown in FIGS. 5 and 6. Notice that there is a second gap 38 between the face of wheel 9 and the face 37 of wheel 39 so that no power is transmitted to wheel 39 when the invention is in "neutral". Wheel 39 engages driven unit 2 and is rotatably carried by a stub shaft which is part of the support 8.

FIG. 6 is the same as FIG. 5 except that the wheel 9 has been further shifted 31 radially outward from axis 15 so that wheel 9 closes gap 38 and contacts the face 37 on the rotatable wheel 39 for transmitting drive to wheel 39. Contact between wheel 9 and wheel 39 reverses the drive to unit 2. The maximum outward shaft 31 from axis 15 occurs when the arm 5 abuts bumpers 49 on support 8. The bumpers 49 prevent extreme lateral forces on wheel 9. Shaft 7 continues to rotate wheel 9 in the same direction 32 as when the wheel 9 is in position 9'. Wheel 39 engages the annular inner side of unit 2 so that power can be transmitted between wheel 39 and unit 2. As wheel 9 drives wheel 39, the wheel 39 will rotate the unit 2 in the reverse direction from the forward direction imposed upon unit 2 by wheel 9 at position 9'.

Disengaging reverse is brought about by reversing the rotational direction 36 of shaft 3. This causes a reverse rotational shift 30 of shaft 14 which further causes a reversal of the axial shift 31 of arm 5 so that wheel 9 is shifted inwardly toward axis 15. It is first returned to its neutral position in FIG. 5 where gap 38 appears again. Continuing to reverse the shift 36 causes wheel 9 to engage clutch 19 for absorbing the initial shock load and then wheel 9 engages the underside of the top of unit 2 as shown at position 9' for forward drive of unit 2.

Figure 8:
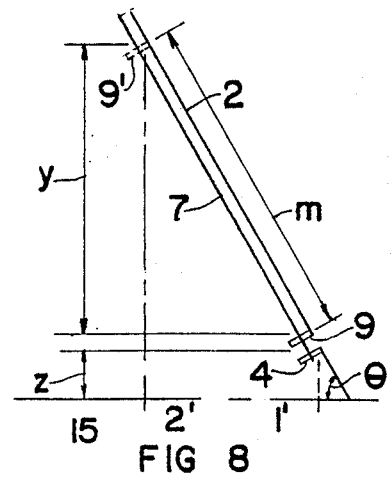
FIG. 8 shows relationships between angles, parts and dimensions for calculating continuously variable torque ratio.

FIG. 7 shows a means of coating the surface of wheel 9 with a suitable e-h oil 40 so that there will be a film of e-h oil between the surfaces of unit 2 and wheel 9 to prevent surface to surface contact between them. The e-h oil 40 may also be used between the face 37 and wheel 9 when the drive to unit 2 is reversed. One end of a flexible tube 45 is mounted on arm 5 to carry the e-h oil 40 from the pump 48. Pump 48 is stationary on support 8 and could be actuated by suitably positioned cam lobes on shaft 7. A sump of the e-h oil 40 is carried by support 8 from which pump 48 forces the oil 40 through hose 45. There is a flexible hose 45 leading to each arm 5 from pump 48. FIG. 1 shows the inside surface of unit 1 and unit 2, that come in contact with wheel 9 and gear 4, extending from axis 45 at an angle of 90°. With this preferred angle, wheel 9 tracks smoothly along the inside surface of unit 2 during rotation. The embodiment of FIG. 1 is not so limited, however, as shown by angle $\theta$ in FIG. 8. The angle $\theta$ may be any practical angle. In FIG. 8, the variable distance m represents the shiftable distance 31 of wheel 9 to any position 9'. The variables z and y represent radial distances from axis 15 to wheel 4 and wheel 9 to position 9' respectively. The torque ratio T between points 1' and 2' is given by:

$$T_{1',2'} = ((m) \sin \theta + z)/z \tag{1}$$

This expression shows that the maximum torque ratio occurs when $\sin \theta = 1$, i.e., (90°) as shown in FIG. 1.

One way to amplify the torque ratio between the input drive to gear 17 and the output drive of unit 2 is to provide a gear 17 with a different diameter than the gear on unit 1. FIG. 4 shows an alternative. In FIG. 4, wheel 4 has a diameter d while the driven wheel 9 has diameter b. The wheel 9 remains shiftable 31 along shafts 7 and 14. For this variation, equation (1) is modified:

$$T_{1',2'} = ((d)(m) \sin \theta + z)/(b)(z) \tag{2}$$

The torque ratio is amplified if d is greater than b. The rotation ratio is amplified if b is greater than d.

The embodiment shown in FIGS. 1, 4, 5, 6 reduces the input rpm and increase torque output like a stepless reduction gear transmission would do. The invention can also do the opposite by increasing the input rpm and reduce torque for output.

FIG. 9 shows reverse drive for an embodiment that increases the output speed from high torque input at gear 17. This embodiment is particularly suitable for use with the inventors' Modular Engine Improvement (U.S. Pat. No. 4,632,081) and the inventors' patent pending Modular Engine invention. Both of these inventions have embodiments that include a reduction gear which places high torque at their power takeoff which could be the input 17 to this invention. The inventors' Linear Reciprocating Engine (U.S. Pat. No. 4,498,430) as corrected is also suitable. In FIG. 9, the drive is transmitted through the wheel (or gear) 4 to the shaft 7 as before but the wheel 4 is placed at the radially extended end of shaft 7. Unit 1 is shaped to engage wheel 4 in this position. Support 8 is also reshaped so that it carries the outer ends of shafts 8 and 14 in opposite positions to those shown in the earlier figures, i.e. FIG. 1. This also requires that the support 8 be shaped differently than shown in FIG. 1 to allow the mesh between shaft 3 and the repositioned shaft 14 but it is simple to do so it is not included in FIG. 9. Support 8 also carries the wheel 39. Wheel 39 is an idler that engages unit 2 as shown in FIG. 9. Wheel 9a is part of wheel 9. Wheel 9a engages wheel 39, to reverse drive between unit 1 and unit 2, when arm 5 is at its most radially extended position as shown in FIG. 9. As in FIG. 5, drive is neutralized between units 1 and 2 when wheel 9 encounters gap 46 before wheel 9a engages wheel 39.

OPERATION

An engine preferably drives gear 17 near the engine's maximum efficiency. This drive is transmitted to unit 1 through gear 17. The unit 1 transmits the drive equally to each of the shafts 7 through gear 4. When torque has to be changed to meet load demand, the wheels 9 are continuously shifted along the axis of shaft 7 from one selected position 9 to another 9' by the controlled rotation of shaft 3. Shaft 3 is rotatably shifted by a small servo motor or other means under a suitable control. The controlled shift of wheels 9 may go in either direction along shaft 7. During this time, the power is transmitted to unit 2 by the wheels 9. Unit 2 transmits the total drive to a power train through its shaft which extends past retaining nut 23.

The wheels 9 simultaneously disengage from unit 2 at the gap 46 to neutralize the drive between unit 1 and unit 2. This occurs at the highest torque, lowest rpm of driven unit 2 if the gap 46 is near the periphery of unit 2. Continuing the rotation of shaft 3 in the same direction closes gap 38 and engages wheel 9 with the wheel 39 to reverse the drive to unit 2.

By reversing the direction of rotation of shaft 3, wheel 9 is caused to shift inwardly toward axis 15 and will disengage from wheel 39. Drive unit 1 and unit 2 will again be neutralized. By continuing the reverse rotation of shaft 3, wheel 9 reengages the clutch member 19 and then the interior surface of unit 2 to effect forward drive. Further radial shift of wheel 9 toward axis 15 continuously decreases the torque ratio and increases the rotation rate between unit 1 and unit 2.

It is to be understood that the forms of the invention herewith shown and described are to be taken as preferred embodiments. Various changes may be made in the shape, size and arrangement of parts and angles. Equivalent elements may be substituted for those illustrated and described; parts may be reversed and certain features of the invention may be utilized independently of the use of other features, all without departing from the intent and scope of the invention. Examples that may be made without departing from the intent of the invention include, but are not limited to, the following:

1. A small axial play along shaft 7 by all but at least one of the wheels 9 automatically adjusts all the wheels 9 equidistant from axis 15 so that the invention can be constructed with loose tolerances. With a plurality of wheels 9, a shifting force applied to at least one of them that is greater than the restaining force on the others will cause all the wheels 9 to self adjust their distances from axis 15. In certain relatively low load applications, this feature allows the elimination of the arms 5 and shafts 14 except for those with the applied shifting force. In other instances, a sleeve threaded to shaft 14 and splined to arm 5 (between the two), can be used to bring about a small axial play of wheel 9 along shaft 7.

2. A force can be applied to shaft 7, i.e. springs, to maintain the proper pressure between wheel 9 and unit 2.

3. Wheel 9 is not limited to the design shown herein. For instance, wheel 9 could include small rollers at its periphery, positioned so that the rollers rotate at an angle to the rotation of wheel $9^4$. The surfaces of the rollers would make up the circumference of wheel 9 and be in contact with unit 2. As wheel 9 is shifted along shaft 7, the rollers would rotate along the surface of unit 2.

4. Wheel 9 could be spring loaded to take up the initial shock load when it moves from neutral at gap 46 to drive. 5. A torsion shaft 7 could replace clutch 19.

I claim:

1. A continuously variable torque drive apparatus, the combination comprising:
   a support;
   a common axis;
   a drive member rotatably sustained by the support about the common axis, the drive member comprising a substantially radially expanded first end;
   a driven member rotatably sustained by the support about the common axis, the driven member comprising a substantially radially expanded second end;
   at least one shaft rotatably carried by the support;
   a first rotational axis for the first shaft, the first rotational axis essentially fixed in a nonparallel relationship with the common axis;
   the first shaft nonrotatably supporting a first roller;
   the first roller shiftable along the first rotational axis for varying the distance between the first roller and the common axis;
   a first communication between the first shaft and one of the ends for transmitting torque therebetween;
   a shiftable communication between the first roller and the other of the ends for transmission of torque therebetween;
   a second shaft rotatably carried by the support, the second shaft comprising a second rotational axis in spaced apart essentially parallel relationship to the first rotational axis;
   a third shaft, the third shaft rotatably sustained by the support, the third shaft essentially coaxial with the common axis;
   an actuator means for actuating a shiftable rotation of the third shaft;
   a second communication between the second shaft and the third shaft for transmitting the shiftable rotation therebetween; and
   an operative coupling between the second shaft and the first roller for shifting the shiftable communication at the urging of the second shaft wherein the actuation of the third shaft by the actuator means actuates the second shaft for shifting the shiftable communication to effect the continuously variable torque drive between the drive and driven members.

2. The combination of claim 1 which includes:
   the first rotational axis comprising a first radial of the common axis; and
   the second rotational axis comprising a second radial of the common axis.

3. The combination of claim 2 wherein the first and the second radials lie essentially in a common plane with the common axis.

4. The combination of claim 1 in which:
   the shiftable communication uses traction fluid, such as elasto-hydrodynamic oil;
   the first communication includes a second roller nonrotatably secured to the first shaft; and
   the first communication uses the traction fluid.

5. The combination of claim 1 which includes:
   the first communication comprising a first gear mesh; and the second communication comprising a second gear mesh.

6. The combination of claim 1 which includes:
the first roller having a first diameter;
the first communication includes a second roller, the second roller having a second diameter; and
the first diameter is different from the second diameter.

7. The combination of claim 1 which includes:
the first roller having a first diameter;
the first communication includes a second roller, the second roller having a second diameter; and
the first diameter is equal to the second diameter.

8. The combination of claim 1 which includes:
a plurality of the shiftable communications wherein each of the plurality is essentially equidistant from the common axis.

9. The combination of claim 8 wherein at least one operative coupling shifts at least one of the plurality.

10. The combination of claim 1 which includes a first means for neutralizing the drive, the first means including:
an annular depression in the other of the ends, the annular depression centered about the common axis wherein shifting the shiftable communication effects a gap at the annular depression between the first roller and the other of the ends to neutralize drive between the drive member and the driven member.

11. The combination of claim 10 which includes a second means for reversing the drive, the second means including:
a second roller rotatably carried by the support;
a third communication between the second roller and the first roller for transmitting the drive therebetween; and
a fourth communication between the second roller and the other of the ends for transmitting th drive therebetween wherein the drive is reversed between the drive and the driven members.

12. The combination of claim 1 which includes:
the first end and the second end substantially form an enclosure for the torque drive apparatus;
the expanded second end forming a substantially hollow cylinder having two essentially flat sides, one of the flat sides having an aperture, the aperture centered about the common axis;
the first end having a perimeter, the perimeter juxtaposed to the aperture;
the shiftable communication is between the first roller and the one of the flat sides; and
the first communication is between the first shaft the first end wherein transmission of continuously variable torque occurs between the first end and the second end.

13. The combination of claim 1 in which: the continuously variable torque drive apparatus is operatively coupled to a gearbox for neutralizing torque of reversing torque.

14. The combination of claim 1 in which the shiftable communication includes friction contact between the first roller and the other of the ends.

15. The combination of claim 1 which includes a torsion shaft.

* * * * *